United States Patent
Matsushita

(10) Patent No.: US 7,313,670 B2
(45) Date of Patent: Dec. 25, 2007

(54) DATA PROCESSING SYSTEM AND SLAVE DEVICE

(75) Inventor: Kenji Matsushita, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 379 days.

(21) Appl. No.: 11/073,719

(22) Filed: Mar. 8, 2005

(65) Prior Publication Data

US 2005/0204075 A1    Sep. 15, 2005

(30) Foreign Application Priority Data

Mar. 10, 2004    (JP)    ............................. 2004-068069

(51) Int. Cl.
*G06F 13/14*    (2006.01)
(52) U.S. Cl. ..................................... 711/213
(58) Field of Classification Search ................ 711/213, 711/218; 710/52
See application file for complete search history.

(56) References Cited

U.S. PATENT DOCUMENTS 6,012,106 A    1/2000    Schumann et al.

2003/0182513 A1    9/2003    Dodd et al.
2004/0015622 A1    1/2004    Avery
2004/0260908 A1    12/2004    Malik et al.

FOREIGN PATENT DOCUMENTS

JP    2000-330929    11/2000

*Primary Examiner*—Kevin L. Ellis
(74) *Attorney, Agent, or Firm*—McDermott Will & Emery LLP

(57) ABSTRACT

A value of the number of prefetch words is preset by a master device 50 in a number of prefetch words setting section 14 of a slave device 10. The number of prefetch words refers to the number of data units sequentially receivable by the master device 50 at a time from the slave device 10. When the slave device 10 receives a read transfer request from the master device 50, a prefetch control section 13 reads from a memory 15 contiguous data units having a quantity equal to the value of the number of prefetch words, and then writes the contiguous data units into a data buffer 12. A bus interface 11 transmits the contiguous data units stored in the data buffer 12 to the master device 50.

4 Claims, 13 Drawing Sheets

DATA PROCESSING SYSTEM AND SLAVE DEVICE

BACKGROUND OF THE INVENTION

1. Field of the Invention

The present invention relates to a data processing system and a slave device. More particularly, the present invention relates to a data processing system in which a master device which issues a data transmission request and a slave device which performs data transmission in response to the request are connected to each other via a system bus, and to the slave device.

2. Description of the Background Art

A conventional data processing system in which data request and transmission are performed between a master device and a slave device is generally realized with a configuration such as that shown in FIG. 12. In the conventional data processing system shown in FIG. 12, a master device 500 and a slave device 100 are connected to each other via a system bus 600. The slave device 100 includes a bus interface 101, a data buffer 102, a prefetch control section 103, and a memory 105.

When the master device 500 needs data held by the slave device 100, the master device 500 transmits to the slave device 100 a read transfer request for the data. The slave device 100 having received the read transfer request from the master device 500 then temporarily stores in the data buffer 102 contiguous data units starting at an associated address in the memory 105, for a subsequent burst transfer.

In a normal DMA transfer, the master device 500 presets in the slave device 100 information such as the number of words to be transferred. By doing so, the slave device 100 can read data of only the necessary number of words from the memory 105 and temporarily store the data in the data buffer 102. In a bus protocol such as a PCI bus, however, the slave device 100 starts on a prefetching process of data upon reception of a first request from the master device 500, and responds to a request for reception after the prefetching process of the data has been completed. Here, even if the number of words for a read transfer requested by the master device 500 to the slave device 100 is one word, since the slave device 100 does not know the requested number of words for the read transfer, the slave device 100 reads contiguous data units having a quantity equal to the number of stages in the data buffer 102 from the memory 105 and then temporarily stores the contiguous data units in the data buffer 102. Therefore, in a system in which a burst transfer does not occur or a system in which only such a burst transfer occurs that the number of data units to be transferred is smaller than the number of stages in the data buffer 102 of the slave device 100, unnecessary data transfer is caused in the slave device 100, resulting in inefficient data transfer in the entire system. FIG. 13 is a diagram for describing data processing for the case where the number of prefetch words is "8" and the number of data units requested by the master device 500 is "1".

As techniques for solving the above-described problem, there is suggested a technique for improving the utilization efficiency of the system bus by optimizing the quantity of data to be transferred according to the maximum buffer size of the slave device 100. See, for example, Japanese Laid-Open Patent Publication No. 2000-330929.

In a slave device of the above-described conventional technique, however, although a data write transfer from a master device to the slave device is considered, a data read transfer from the slave device to the master device is not considered.

SUMMARY OF THE INVENTION

Therefore, an object of the present invention is to provide a data processing system and a data transfer apparatus which are capable of improving the data transfer efficiency of the entire system in a bus protocol such as a PCI bus by optimizing, in particular, a read transfer of data from a slave device to a master device.

The present invention is directed to a data processing system for performing data request and transmission between devices connected to each other via a system bus. In order to attain the object mentioned above, the data processing system of the present invention comprises at least one master device which issues a data transmission request; and at least one slave device which performs data transmission in response to the request from the master device, wherein the slave device includes a data buffer, a number of prefetch words setting section, and a prefetch control section.

The data buffer temporarily stores data read in advance for transmission to the master device. The number of prefetch words setting section sets a value of a number of data words sequentially receivable by the master device at a time. The prefetch control section reads, in response to the request from the master device, contiguous data units having a quantity equal to the value of the number of data words set in the number of prefetch words setting section, from a predetermined memory and then stores the contiguous data units in the data buffer.

The number of prefetch words setting section may include: a number of words setting table in which a plurality of values of the number of data words are set so as to be associated with addresses in the memory; and an address retrieval section for retrieving from the number of words setting table a value of the number of data words associated with an address contained in the request from the master device and then outputs the value to the prefetch control section.

The slave device may further include a number of prefetch words updating section for updating the value of the number of data words set in the number of prefetch words setting section, based on a number of data words actually transmitted to the master device or based on a number of data words actually transmitted to the master device and a storage address for the transmitted data words.

It is preferred that the values of the number of data words in the number of words setting table be set for different data types, or for a plurality of master devices. The number of data words sequentially receivable by the master device at a time may be preset by the master device in the number of prefetch words setting section.

As described above, according to the present invention, a single optimal value of the number of prefetch words for the master device is preset in the slave device, or a plurality of optimal values of the number of prefetch words for the master device are preset in the slave device so as to be associated with a plurality of addresses in the memory. By doing so, the number of unnecessary data transfer processes performed by the slave device in response to a data transmission request issued by the master device is reduced, and accordingly, the data processing efficiency of the entire system is improved. In the case of setting a plurality of values of the number of prefetch words, even in the case where different values of the number of prefetch words are used for different data types, or the case where a plurality of master devices are connected to the same system bus and both a single transfer and a burst transfer are performed, flexible operation can be achieved.

In addition, according to the present invention, each time data transmission to the master device takes place, the slave device re-sets a single value of the number of prefetch words or a plurality of values of the number of prefetch words associated with addresses. By doing so, the optimal value of the number of prefetch words for the system can be automatically set without the user being aware of it.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
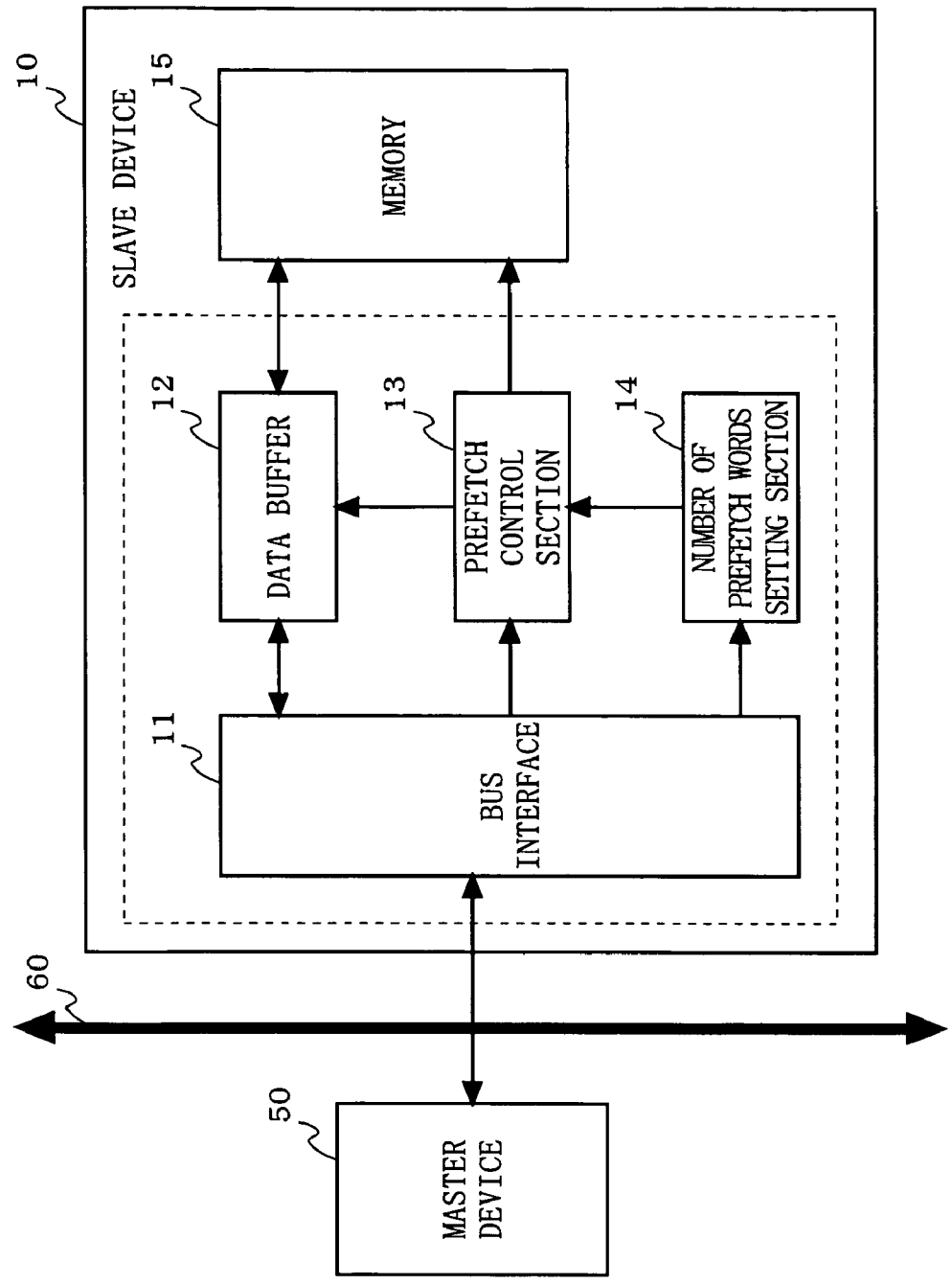
FIG. 1 is a diagram showing a configuration of a data processing system according to a first embodiment of the present invention.

FIG. 1 is a diagram showing a configuration of a data processing system according to a first embodiment of the present invention. In the data processing system according to the first embodiment shown in FIG. 1, a master device 50 and a slave device 10 are connected to each other via a system bus 60. The slave device 10 includes a bus interface 11, a data buffer 12, a prefetch control section 13, a number of prefetch words setting section 14, and a memory 15. Note that although the first embodiment describes the case where a single slave device 10 is connected to the system bus 60, a plurality of slave devices 10 may be provided.

The bus interface 11 connects between the master device 50 and the slave device 10 via the system bus 60, and performs operations such as reception of various requests from the master device 50 and data transmission to the master device 50. The data buffer 12 stores data read in advance and transferred (prefetched) from the memory 15. As the data buffer 12, a FIFO may be used, for example. The number of prefetch words setting section 14 sets a value of the number of prefetch words which indicates the number of data units to be read from the memory 15 for a single prefetching process. As the number of prefetch words setting section 14, a register may be used, for example. The prefetch control section 13 controls reading of data from the memory 15 and writing of data into the data buffer 12 according to the value of the number of prefetch words set in the number of prefetch words setting section 14. The memory 15 stores various data.

Figure 2:
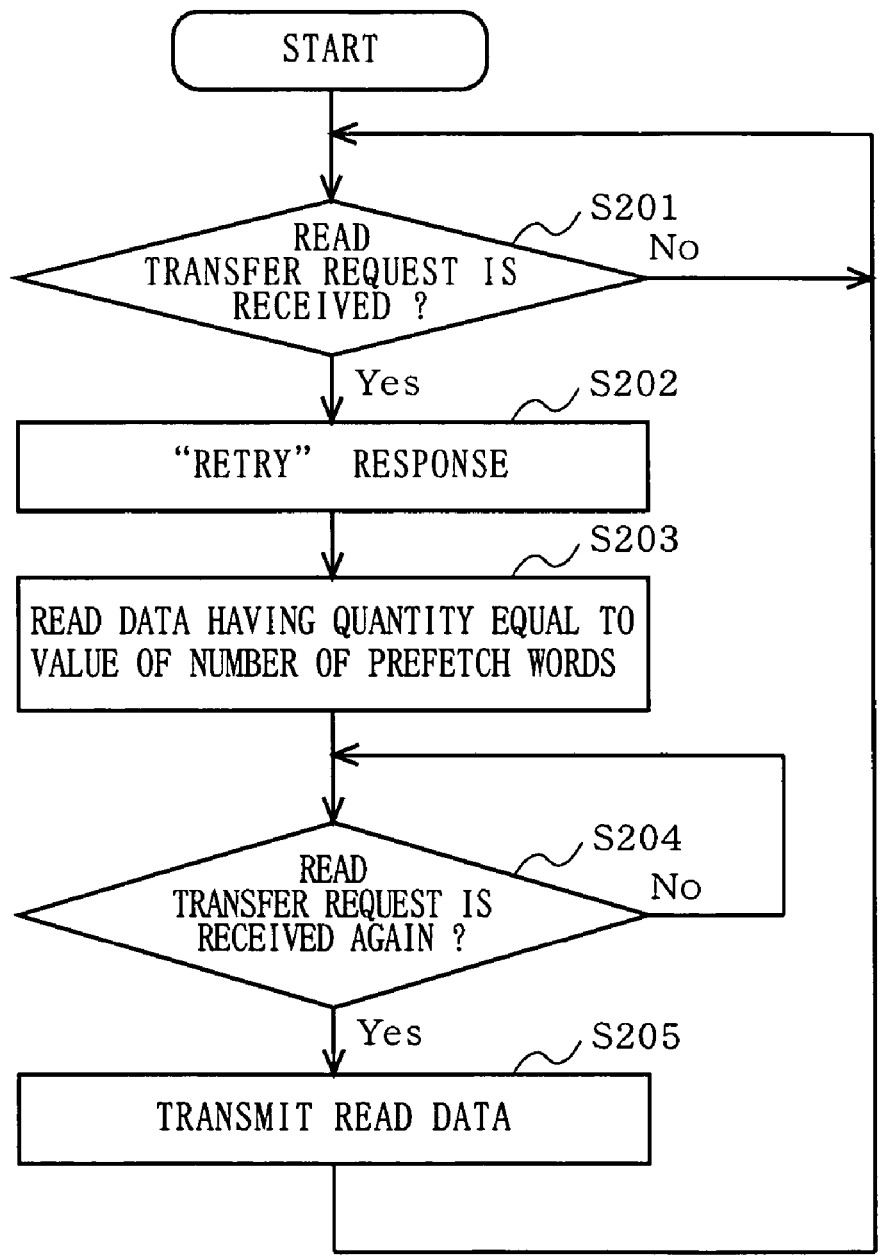
FIG. 2 is a flowchart showing the steps in data transmission processing performed by a slave device 10 shown in FIG. 1.

With further reference to FIG. 2, data transmission processing performed by the slave device 10 having the above-described configuration will be described. FIG. 2 is a flowchart showing the steps in the data transmission processing performed by the slave device 10.

Prior to actual data request and transmission, first, the master device 50 sets a value of the number of prefetch words in the number of prefetch words setting section 14 of the slave device 10. The number of prefetch words refers to the number of data words sequentially receivable by the master device 50 at a time from the slave device 10, and is determined based on the throughput of the master device 50 or the like. The value of the number of prefetch words is preferably set to the maximum value of the number of data words receivable by the master device 50. The master device 50 transmits, at a predetermined timing at which a value of the number of prefetch words should be set (e.g., at system startup or at the time when a read request is issued), to the slave device 10 a request to write the value of the number of prefetch words (i.e., a write transfer request) which contains the value of the number of prefetch words and an address indicating that the write destination is the number of prefetch words setting section 14.

The slave device 10 receives at the bus interface 11 the write transfer request transmitted from the master device 50. The bus interface 11 decodes the address contained in the write transfer request and thereby determines that the request is destined for the number of prefetch words setting section 14, and then sets the value of the number of prefetch words contained in the request in the number of prefetch words setting section 14.

After the setting of the value of the number of prefetch words has been completed, when the master device 50 needs data held by the slave device 10, the master device 50 transmits to the slave device 10 a request to transmit the data (i.e., a read transfer request). The read transfer request contains an address indicating a data storage location within the memory 15 of the slave device 10.

The slave device 10 receives at the bus interface 11 the read transfer request transmitted from the master device 50 ("Yes" in step S201). The bus interface 11 then decodes the address contained in the read transfer request and thereby determines that the request is destined for the memory 15, and then outputs a value of the address to the prefetch control section 13. At this stage, the slave device 10 cannot immediately respond to the read transfer request from the master device 50. Therefore, in the case where the system bus 60 uses a protocol such as a PCI bus, the bus interface 11 responds to the master device 50 by returning a retry request (step S202). The prefetch control section 13 reads from the memory 15 contiguous data units starting at a start address which is the address provided from the bus interface 11, and having a quantity equal to the value of the number of prefetch words set in the number of prefetch words setting section 14, and then writes the contiguous data units into the data buffer 12 (step S203). Namely, a data transfer from the memory 15 to the data buffer 12 is performed. After the data transfer from the memory 15 to the data buffer 12 has been completed, if the slave device 10 receives a read transfer request for data at the same address again from the master device 50 ("Yes" in step S204), the bus interface 11 transmits the contiguous data units stored in the data buffer 12 to the master device 50 (step S205).

As described above, in the data processing system according to the first embodiment of the present invention, the optimal value of the number of prefetch words for the master device is preset in the slave device. By doing so, the number of unnecessary data transfer processes performed by the slave device in response to a data transmission request (a read transfer request) issued by the master device is reduced, and accordingly, the data processing efficiency of the entire system is improved.

Second Embodiment

Figure 3:
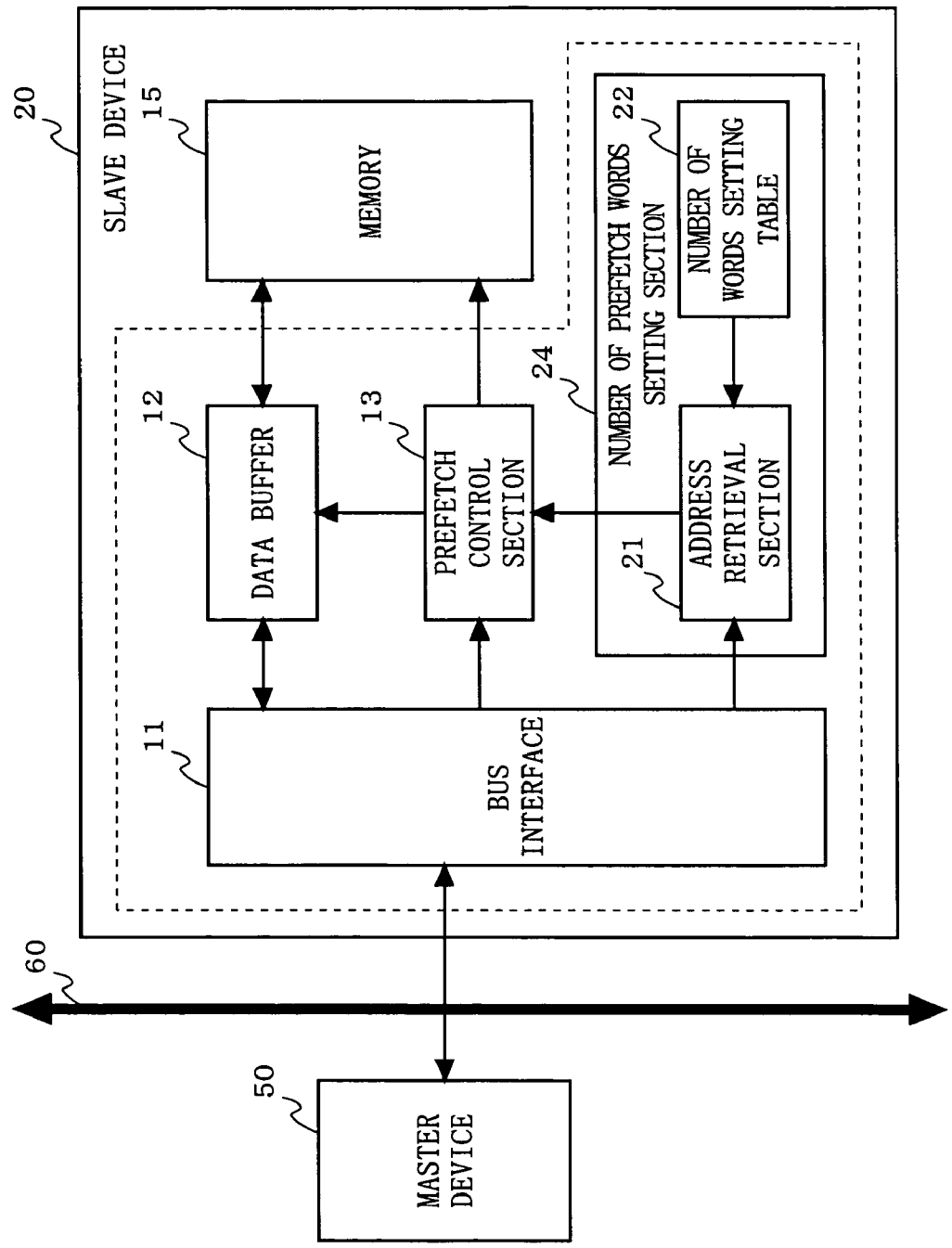
FIG. 3 is a diagram showing a configuration of a data processing system according to a second embodiment of the present invention.

FIG. 3 is a diagram showing a configuration of a data processing system according to a second embodiment of the present invention. In the data processing system according to the second embodiment shown in FIG. 3, a master device 50 and a slave device 20 are connected to each other via a system bus 60. The slave device 20 includes a bus interface 11, a data buffer 12, a prefetch control section 13, a number of prefetch words setting section 24, and a memory 15. The number of prefetch words setting section 24 includes an address retrieval section 21 and a number of words setting table 22. Note that although the second embodiment describes the case where a single slave device 20 is connected to the system bus 60, a plurality of slave devices 20 or both the aforementioned slave device 10 and the slave device 20 may be provided. In addition, a plurality of master devices 50 may be connected to the system bus 60.

As can be seen in FIG. 3, the slave device 20 of the second embodiment is different from the slave device 10 of the first embodiment in that the number of prefetch words setting section 24 including the address retrieval section 21 and the number of words setting table 22 is used in place of the number of prefetch words setting section 14. The second embodiment will be described below mainly in terms of the differing component.

Figure 4:
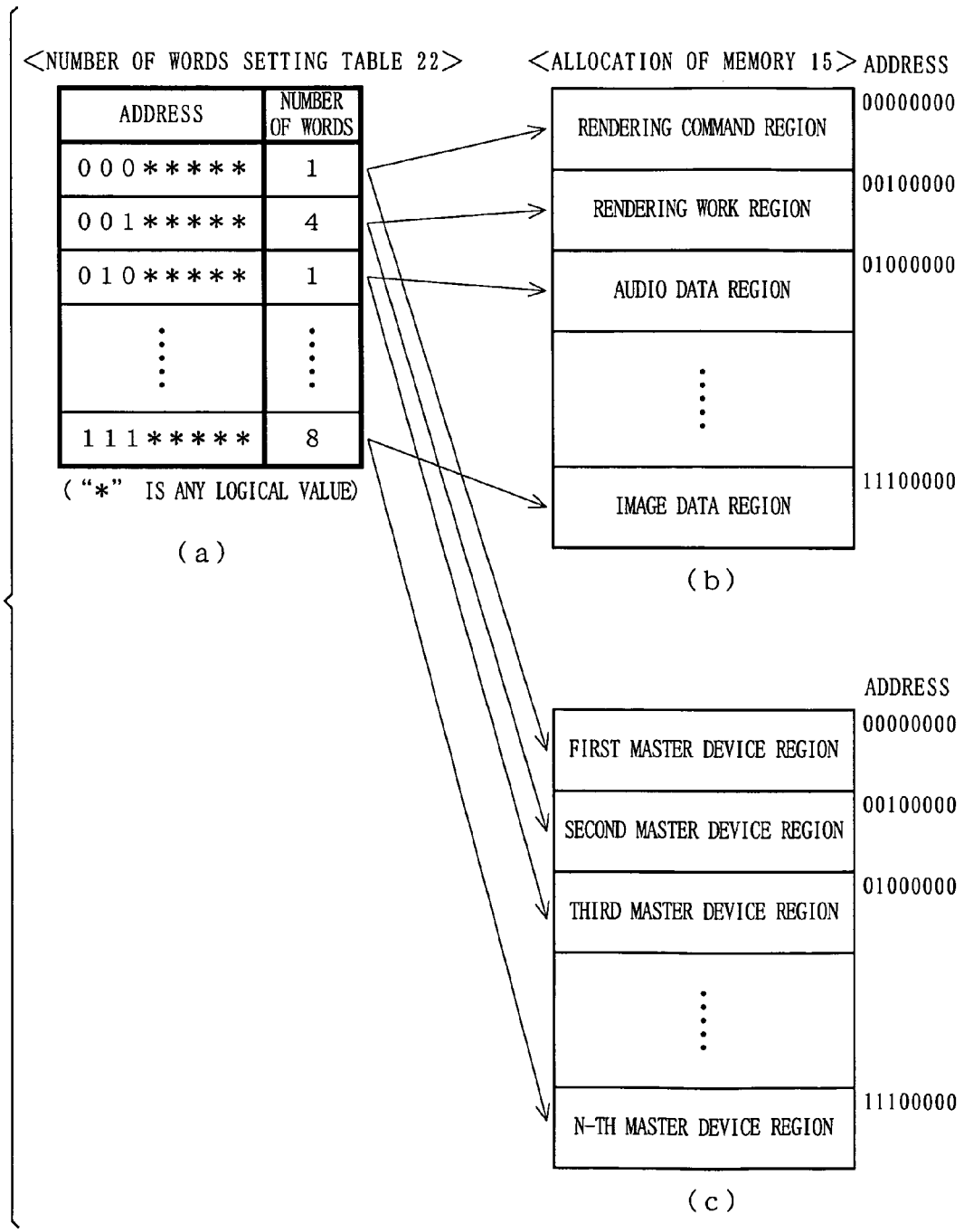
FIG. 4 is a diagram for describing exemplary information stored in a number of words setting table 22 shown in FIG. 3.

The number of words setting table 22 stores information used to dynamically change the value of the number of prefetch words to be read from the memory 15 for a single prefetching process. Specifically, the information has values of the number of prefetch words associated with a plurality of subregions into which the data storage region of the memory 15 is partitioned by address (see (a) of FIG. 4). Examples of a preferable partition include the following. The memory 15 may be divided in advance into storage regions having contiguous addresses, for different data types such that each storage region has a set of contiguous addresses, and values of the number of prefetch words may be set for the storage regions of different data types (see (b) of FIG. 4). By this, the quantity of data to be transferred can be easily changed according to the data type. Alternatively, in the case where a plurality of master devices 50 are connected to the system bus 60, the memory 15 may be divided in advance into storage regions having contiguous addresses, for the plurality of master devices such that each master device has a set of contiguous addresses, and values of the number of prefetch words may be set for the plurality of master devices (see (c) of FIG. 4).

Figure 5:
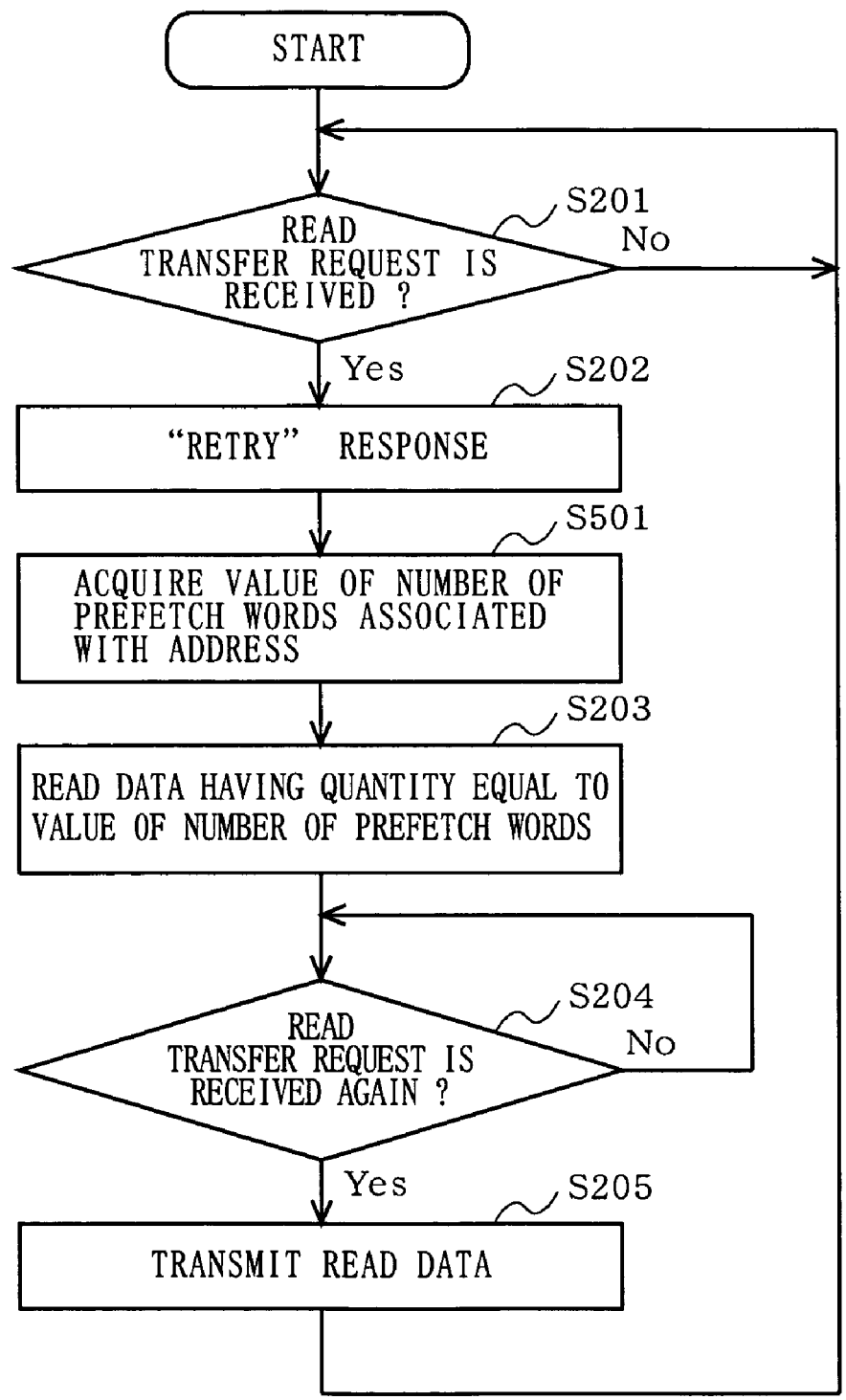
FIG. 5 is a flowchart showing the steps in data transmission processing performed by a slave device 20 shown in FIG. 3.

With further reference to FIG. 5, data transmission processing performed by the slave device 20 having the above-described configuration will be described. FIG. 5 is a flowchart showing the steps in the data transmission processing performed by the slave device 20. Note that in FIG. 5 the steps of the same operations as those described in FIG. 2 are designated by the same step numbers.

Prior to actual data request and transmission, first, the master device 50 sets values of the number of prefetch words in the number of words setting table 22 of the slave device 20. The setting is made such that, as in the above-described example, the values of the number of prefetch words are associated with addresses in the memory 15. The master device 50 transmits, at a predetermined timing at which a value of the number of prefetch words should be set, to the slave device 20 a write transfer request which contains the value of the number of prefetch words and an address indicating that the write destination is the number of words setting table 22.

The slave device 20 receives at the bus interface 11 the write transfer request transmitted from the master device 50. The bus interface 11 decodes the address contained in the write transfer request and thereby determines that the request is destined for the number of words setting table 22, and then sets the value of the number of prefetch words contained in the request in the number of words setting table 22.

After the setting of the values of the number of prefetch words has been completed, when the master device 50 needs data held by the slave device 20, the master device 50 transmits to the slave device 20 a read transfer request for the data. The read transfer request contains an address indicating a data storage location within the memory 15 of the slave device 20.

The slave device 20 receives at the bus interface 11 the read transfer request transmitted from the master device 50 ("Yes" in step S201). The bus interface 11 then decodes the address contained in the read transfer request and thereby determines that the request is destined for the memory 15, and then outputs a value of the address to the prefetch control section 13 and the address retrieval section 21. In addition, the bus interface 11 responds to the master device 50 by returning a retry request (step S202) The address retrieval section 21 retrieves, using the address provided from the bus interface 11 as a key, a value of the number of prefetch words associated with the address from the number of words setting table 22 (step S501). The prefetch control section 13 reads from the memory 15 contiguous data units starting at a start address which is the address provided from the bus interface 11, and having a quantity equal to the value of the number of prefetch words retrieved by the address retrieval section 21, and then writes the contiguous data units into the data buffer 12 (step S203). After the data transfer from the memory 15 to the data buffer 12 has been completed, if the slave device 20 receives a read transfer request for data at the same address again from the master device 50 ("Yes" in step S204), the bus interface 11 transmits the contiguous data units stored in the data buffer 12 to the master device 50 (step S205).

As described above, in the data processing system according to the second embodiment of the present invention, a plurality of optimal values of the number of prefetch words for the master device are preset in the slave device so as to be associated with a plurality of addresses in the memory. By doing so, the number of unnecessary data transfer processes performed by the slave device in response to a read transfer request for data issued by the master device is reduced, and accordingly, the data processing efficiency of the entire system is improved. In addition, even in the case where different values of the number of prefetch words are used for different data types, or the case where a plurality of master devices are connected to the same system bus and both a single transfer and a burst transfer are performed, flexible operation can be achieved.

Third Embodiment

The foregoing first and second embodiments describe the case where the optimal value of the number of prefetch words is preset in a slave device by a master device. The following third and fourth embodiments describe the case where the optimal value of the number of prefetch words is automatically set by a slave device itself based on the conditions of actually performed data transmission and reception, instead of being set by a master device 50.

Figure 6:
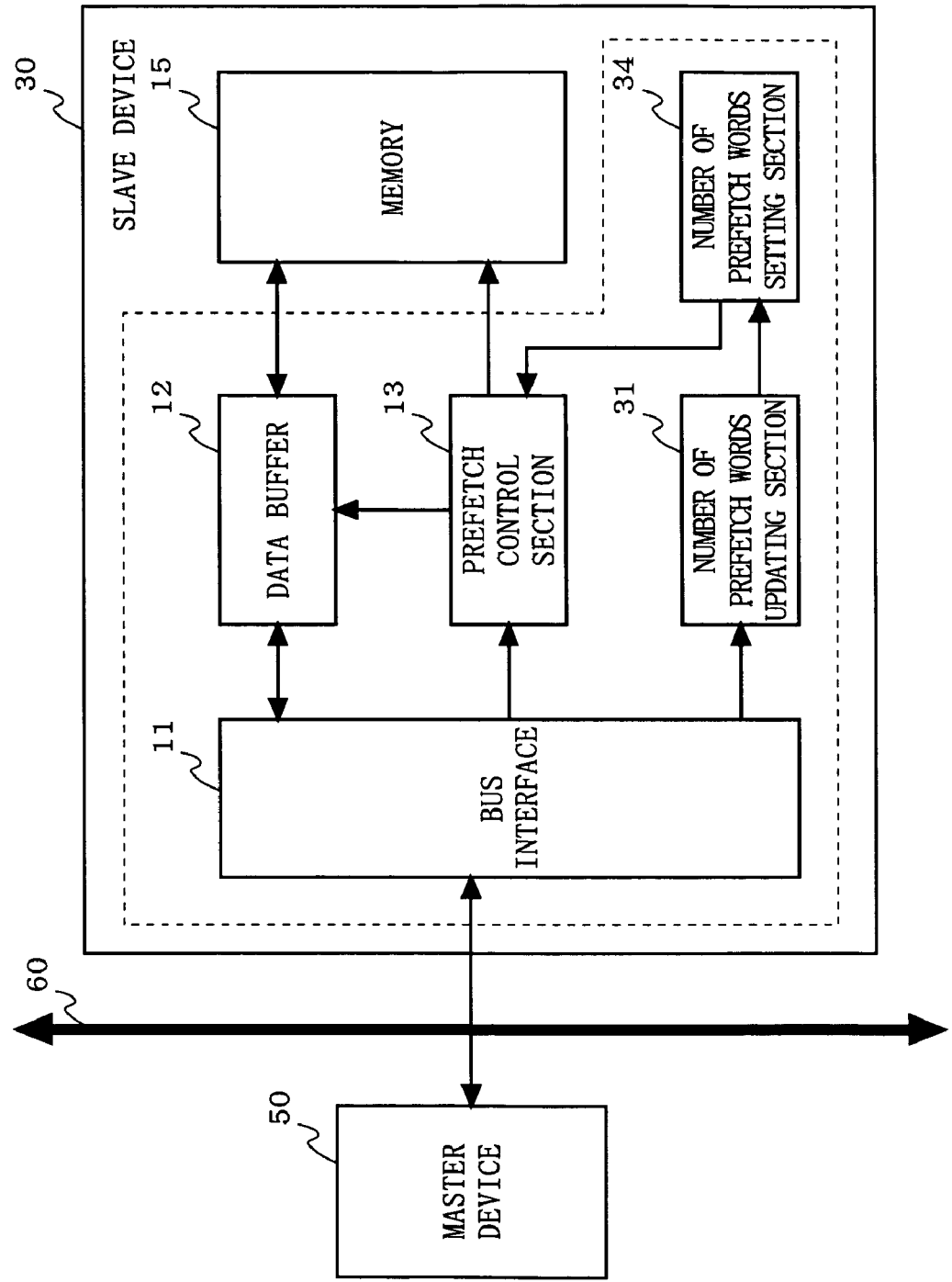
FIG. 6 is a diagram showing a configuration of a data processing system according to a third embodiment of the present invention.

FIG. 6 is a diagram showing a configuration of a data processing system according to the third embodiment of the present invention. In the data processing system according to the third embodiment shown in FIG. 6, a master device 50 and a slave device 30 are connected to each other via a system bus 60. The slave device 30 includes a bus interface 11, a data buffer 12, a prefetch control section 13, a number of prefetch words updating section 31, a number of prefetch words setting section 34, and a memory 15. In the third embodiment too, a plurality of slave devices 30 may be connected to the system bus 60.

As can be seen in FIG. 6, the slave device 30 of the third embodiment is different from the slave device 10 of the first embodiment in that the number of prefetch words updating section 31 and the number of prefetch words setting section 34 are used in place of the number of prefetch words setting section 14. The number of prefetch words updating section 31 updates the value of the number of prefetch words set in the number of prefetch words setting section 34, based on the number of data words transmitted from the bus interface 11 to the master device 50.

Figure 7:
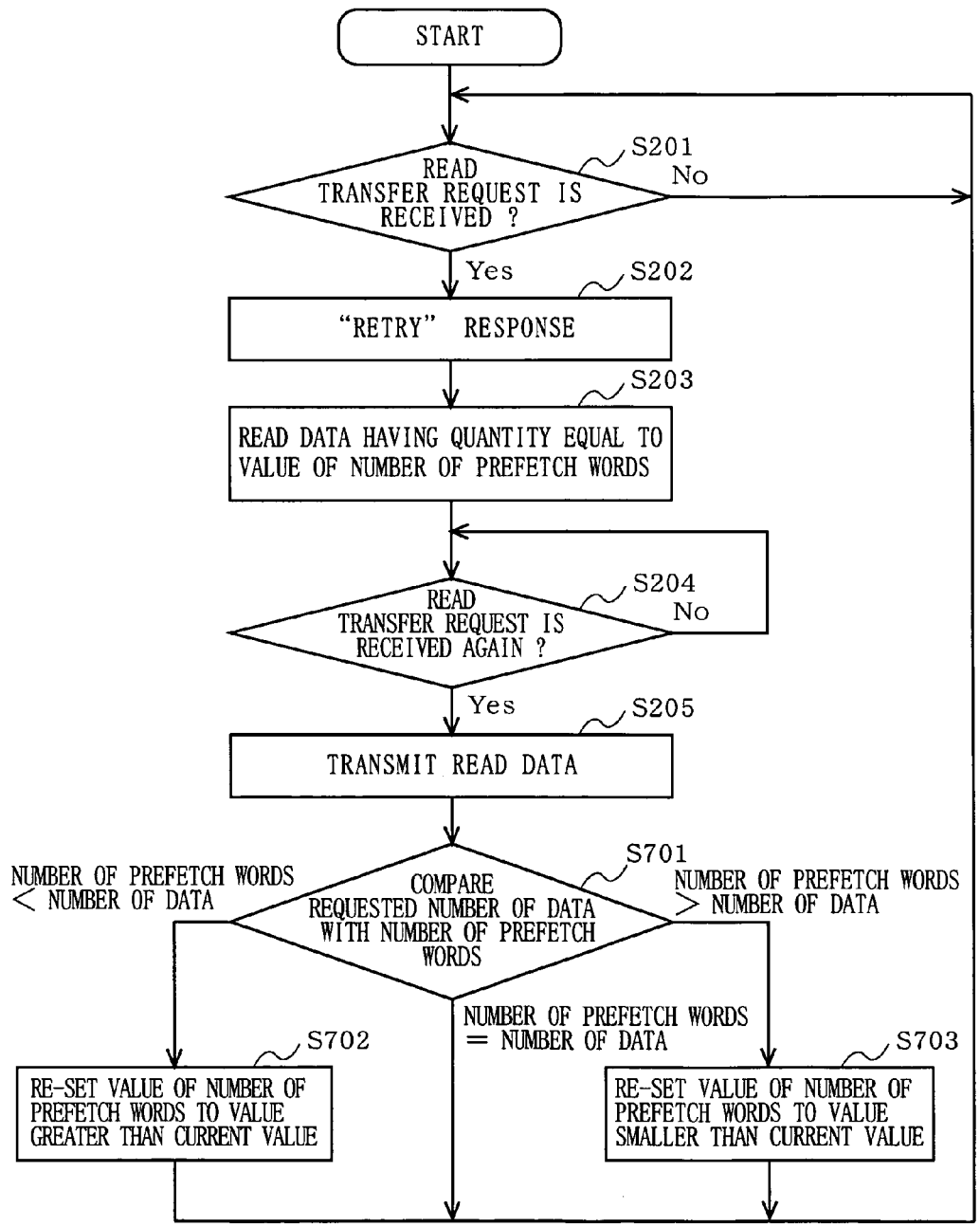
FIG. 7 is a flowchart showing the steps in data transmission processing performed by a slave device 30 shown in FIG. 6.

The data transmission processing performed by the slave device 30 of the third embodiment will be described below mainly in terms of the differing components. FIG. 7 is a flowchart showing the steps in the data transmission processing performed by the slave device 30. Note that in FIG. 7 the steps of the same operations as those described in FIG. 2 are designated by the same step numbers.

In the third embodiment, as an initial value set immediately after system startup or the like, any value of the number of prefetch words can be set in the number of prefetch words setting section 34. The initial value may be, for example, a value of "1" or a value indicating the number of stages in the data buffer 12. When the master device 50 needs data held by the slave device 30, the master device 50 transmits to the slave device 30 a read transfer request for the data. Processes, including from reception by the bus interface 11 of the read transfer request transmitted from the master device 50 to transmission by the bus interface 11 of data stored in the data buffer 12 to the master device 50, are the same as those described in FIG. 2 (steps S201 to S205).

The number of prefetch words updating section 31 determines, as a response to the read transfer request transmitted from the master device 50, whether an appropriate number of data units has been transmitted from the bus interface 11 (step S701). Specifically, the number of prefetch words updating section 31 determines whether the number of data units requested by the master device 50 is greater or smaller than the number of data units read in advance and stored in the data buffer 12, which is equal to the value of the number of prefetch words. The occurrence of the master device 50 requesting to transmit a greater number of data units than the number of data units stored in the data buffer 12, can be easily determined by whether a suspension response (a disconnect response) is issued, in the case where, for example, the system bus 60 uses a protocol such as a PCI bus. On the other hand, the occurrence of the master device 50 requesting to transmit a smaller number of data units than the number of data units stored in the data buffer 12, can be easily determined by whether there is data discarded in the data buffer 12.

As the result of the determination, if it is determined that the master device 50 is requesting to transmit a greater number of data units than the number of data units stored in the data buffer 12, the number of prefetch words updating section 31 re-sets the value of the number of prefetch words set in the number of prefetch words setting section 34 to a value greater than the current value (step S702). On the other hand, if it is determined that the master device 50 is requesting to transmit a smaller number of data units than the number of data units stored in the data buffer 12, the number of prefetch words updating section 31 re-sets the value of the number of prefetch words set in the number of prefetch words setting section 34 to a value smaller than the current value (step S703). Note that the value to be re-set can be determined freely.

Figure 8:
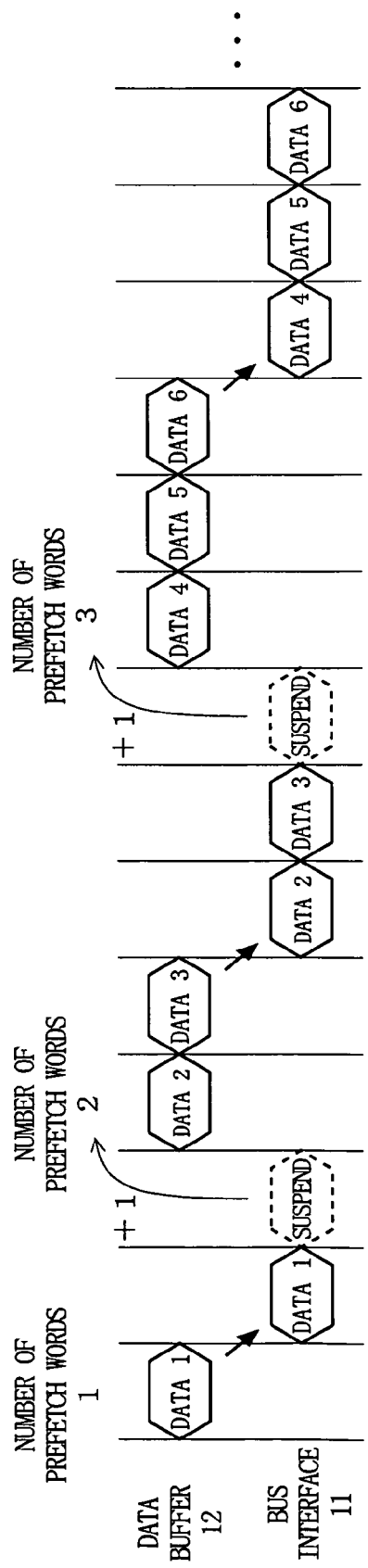
FIG. 8 is a diagram for describing exemplary data processing performed based on the steps in the data transmission processing shown in FIG. 7.
Figure 9:
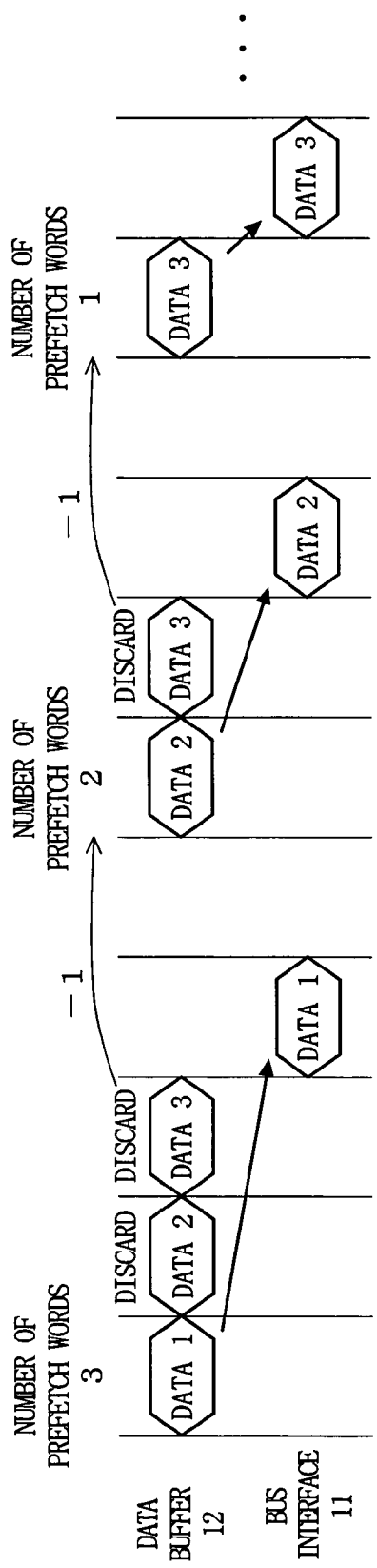
FIG. 9 is a diagram for describing another exemplary data processing performed based on the steps in the data transmission processing shown in FIG. 7.

FIG. 8 is a diagram for describing data processing for the case where the initial value of the number of prefetch words set in the number of prefetch words setting section 34 is "1" and the number of data units requested by the master device 50 is "3". FIG. 9 is a diagram for describing data processing for the case where the initial value of the number of prefetch words set in the number of prefetch words setting section 34 is "3" and the number of data units requested by the master device 50 is "1".

As described above, in the data processing system according to the third embodiment of the present invention, each time data transmission to the master device takes place, the slave device re-sets the value of the number of prefetch words. By doing so, the optimal value of the number of prefetch words for the system can be automatically set without the user being aware of it. Thus, the number of unnecessary data transfer processes performed by the slave device in response to a read transfer request for data issued by the master device is reduced, and accordingly, the data processing efficiency of the entire system is improved.

Fourth Embodiment

Figure 10:
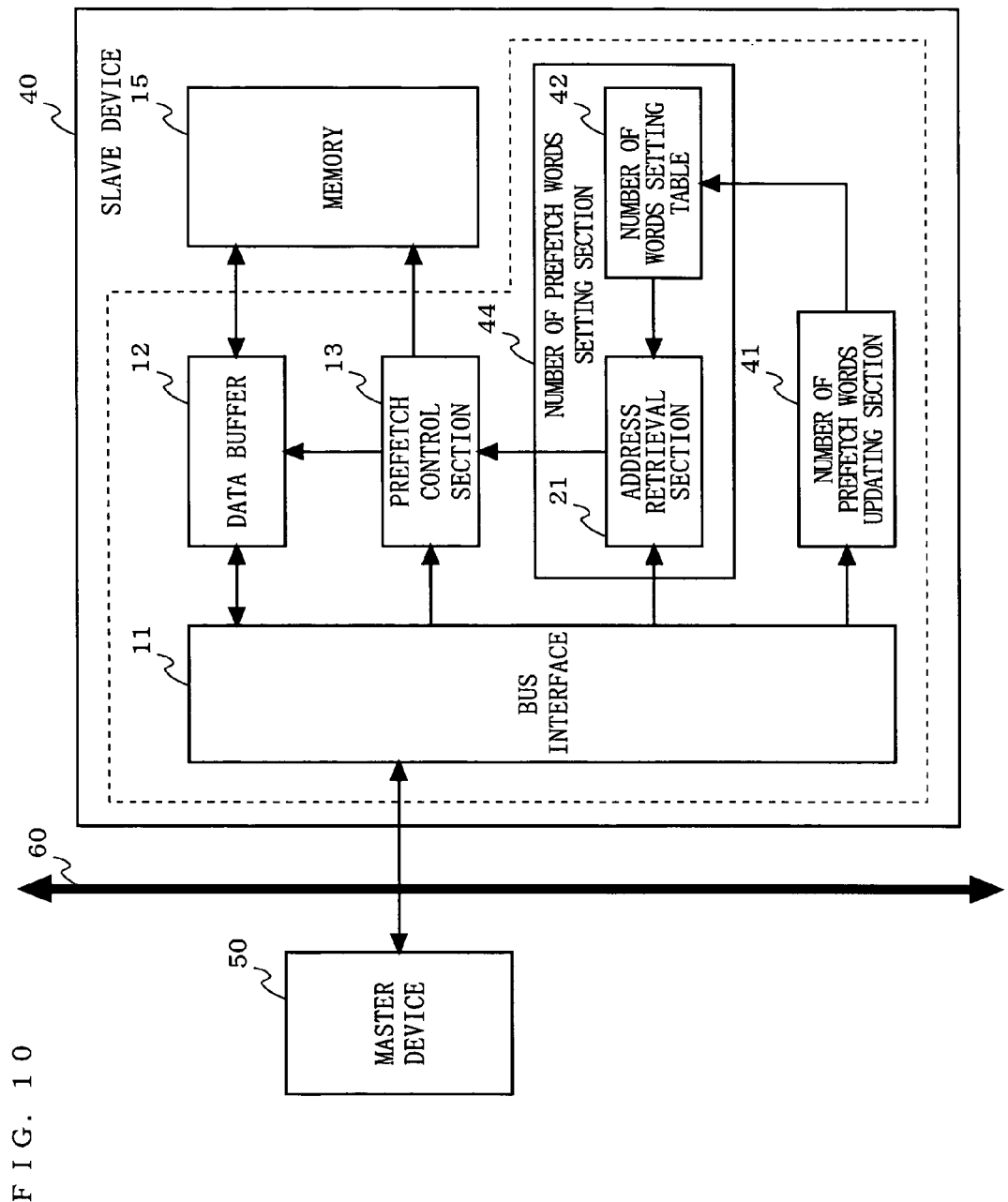
FIG. 10 is a diagram showing a configuration of a data processing system according to a fourth embodiment of the present invention.

FIG. 10 is a diagram showing a configuration of a data processing system according to a fourth embodiment of the present invention. In the data processing system according to the fourth embodiment shown in FIG. 10, a master device 50 and a slave device 40 are connected to each other via a system bus 60. The slave device 40 includes a bus interface 11, a data buffer 12, a prefetch control section 13, a number of prefetch words setting section 44, a number of prefetch words updating section 41, and a memory 15. The number of prefetch words setting section 44 includes an address retrieval section 21 and a number of words setting table 42. In the fourth embodiment too, a plurality of slave devices 40 and/or a plurality of master devices 50 may be connected to the system bus 60.

As can be seen in FIG. 10, the slave device 40 of the fourth embodiment is different from the slave device 20 of the second embodiment in that the number of prefetch words updating section 41 and the number of words setting table 42 are used in place of the number of words setting table 22. The number of prefetch words updating section 41 updates the value of the number of prefetch words set in the number of words setting table 42, based on the number of data words transmitted from the bus interface 11 to the master device 50.

Figure 11:
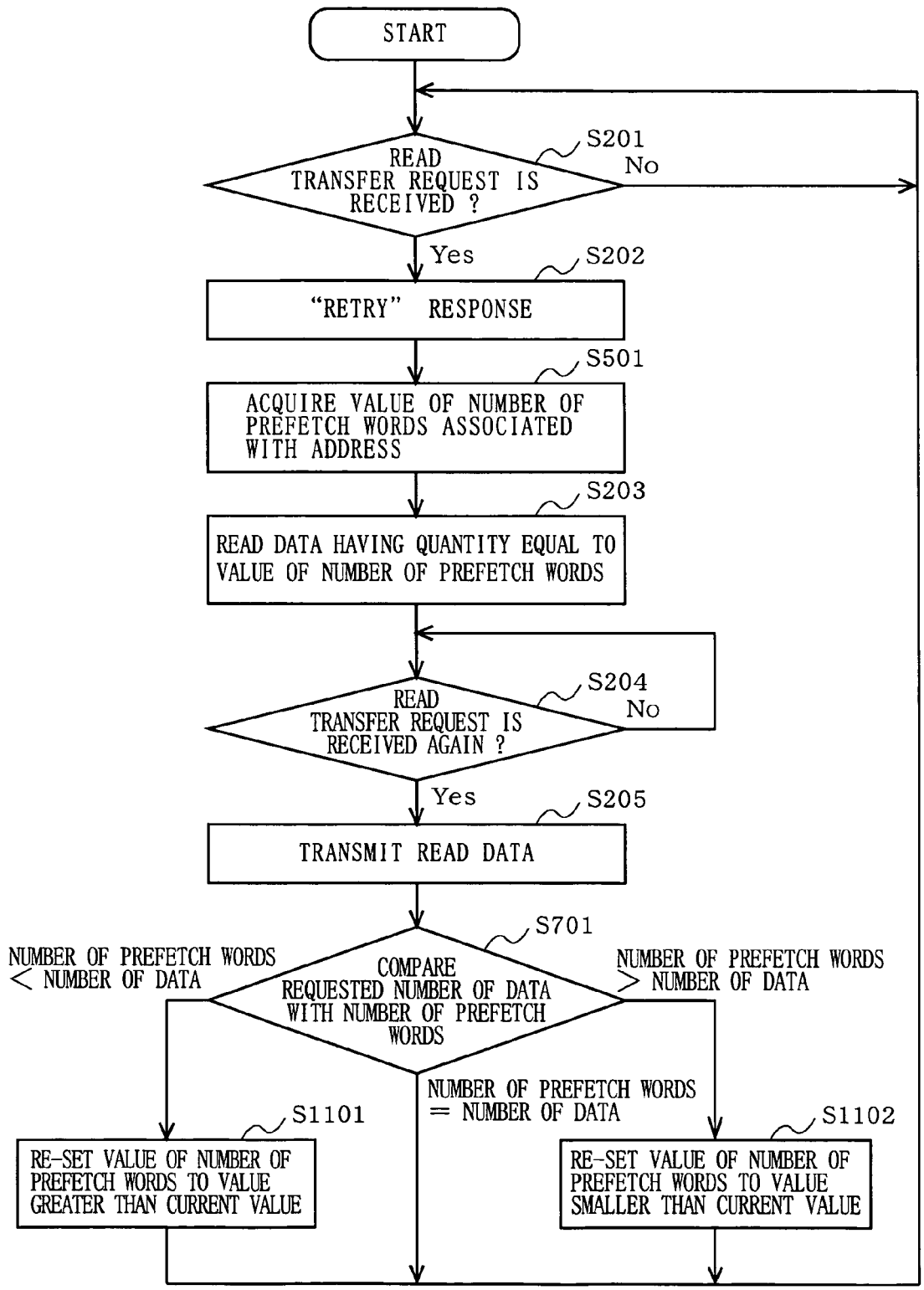
FIG. 11 is a flowchart showing the steps in data transmission processing performed by a slave device 40 shown in FIG. 10.
Figure 12:
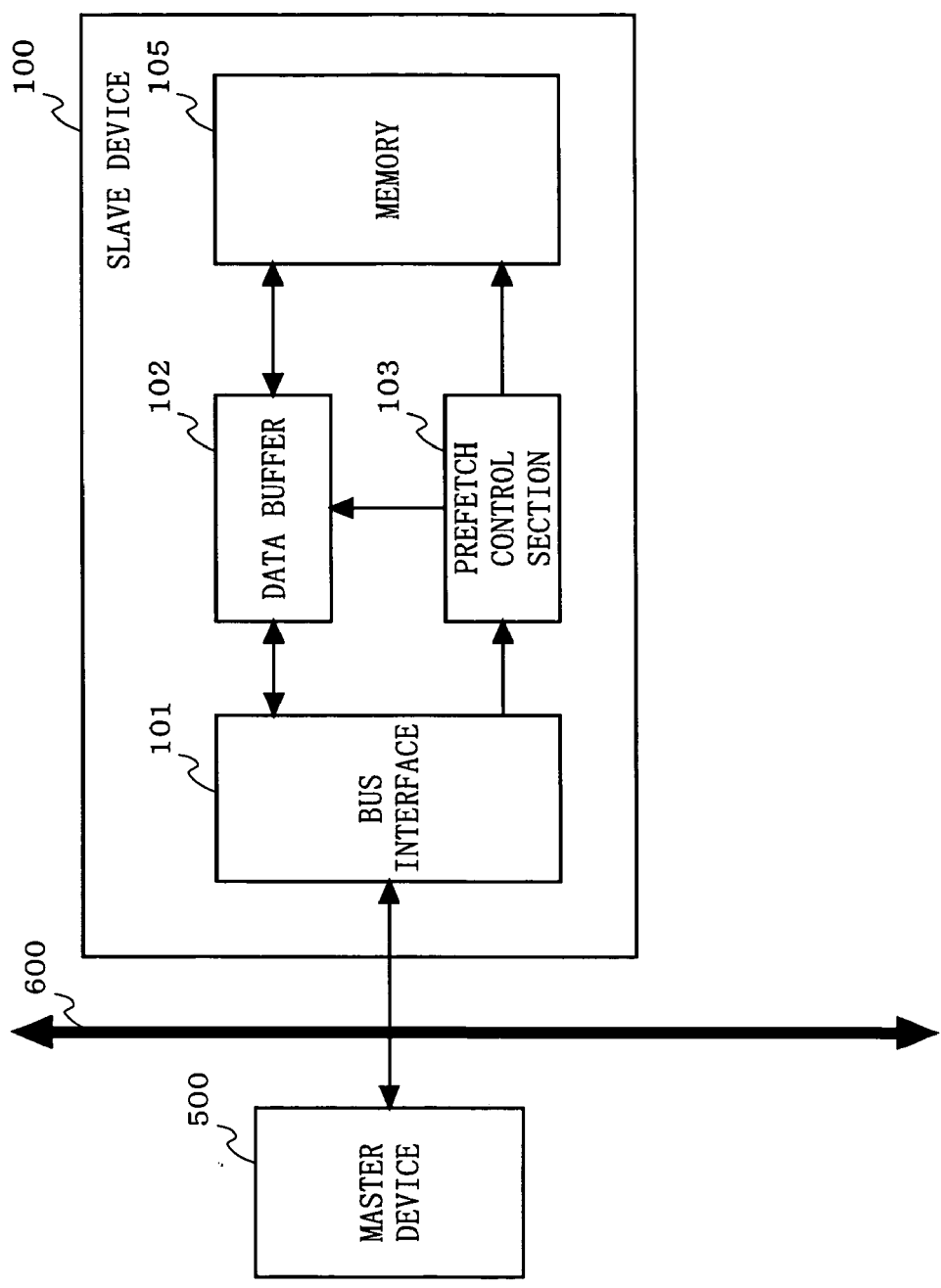
FIG. 12 is a diagram showing a configuration of a conventional data processing system.
Figure 13:
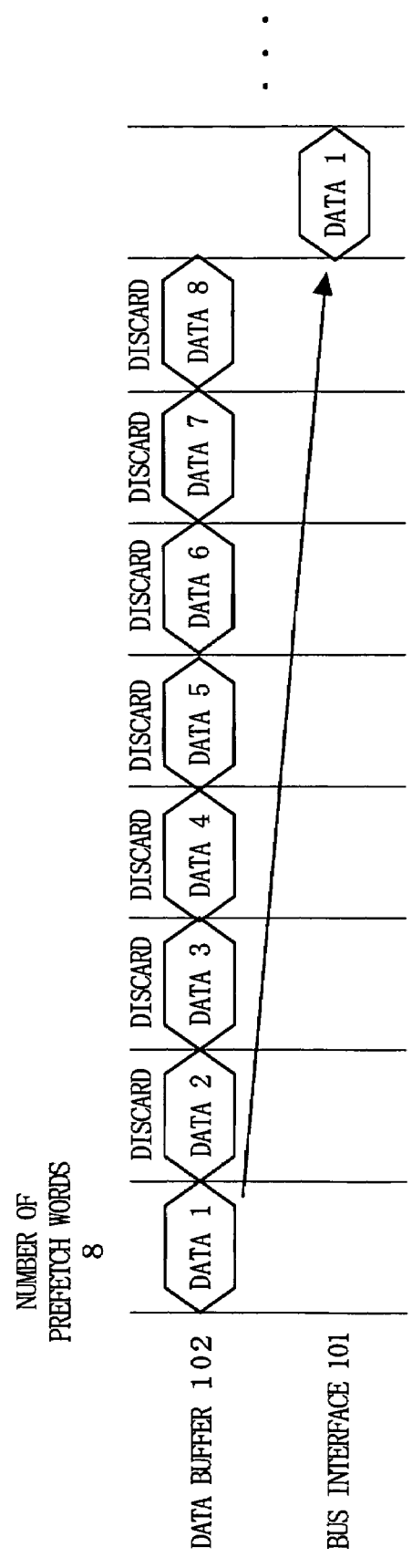
FIG. 13 is a diagram for describing a problem arose in the conventional data processing system.

The data transmission processing performed by the slave device 40 of the fourth embodiment will be described below mainly in terms of the differing components. FIG. 11 is a flowchart showing the steps in the data transmission processing performed by the slave device 40. Note that in FIG. 11 the steps of the same operations as those described in FIGS. 2 and 5 are designated by the same step numbers.

In the fourth embodiment, as an initial value set immediately after system startup or the like, any value of the number of prefetch words can be set in the number of words setting table 42. The initial value may be, for example, a value of "1" or a value indicating the number of stages in the data buffer 12. When the master device 50 needs data held by the slave device 40, the master device 50 transmits to the slave device 40 a read transfer request for the data. Processes, including from reception by the bus interface 11 of the read transfer request transmitted from the master device 50 to transmission by the bus interface 11 of data stored in the data buffer 12 to the master device 50, are the same as those described in FIGS. 2 and 5 (steps S201 to S205 and S501).

The number of prefetch words updating section 41 determines, as a response to the read transfer request transmitted from the master device 50, whether an appropriate number of data units has been transmitted from the bus interface 11 (step S701). Specifically, The number of prefetch words updating section 41 determines whether the number of data units requested by the master device 50 is greater or smaller than the number of data units read in advance and stored in the data buffer 12, which is equal to the value of the number of prefetch words. The occurrence of the master device 50 requesting to transmit a greater number of data units than the number of data units stored in the data buffer 12, can be easily determined by whether a suspension response (a disconnect response) is issued, in the case where, for example, the system bus 60 uses a protocol such as a PCI bus. On the other hand, the occurrence of the master device 50 requesting to transmit a smaller number of data units than the number of data units stored in the data buffer 12, can be easily determined by whether there is data discarded in the data buffer 12.

As the result of the determination, if it is determined that the master device 50 is requesting to transmit a greater number of data units than the number of data units stored in the data buffer 12, the number of prefetch words updating section 41 re-sets a value of the number of prefetch words set in the number of words setting table 42 and associated with the address contained in the request to a value greater than the current value (step S1101). On the other hand, if it is determined that the master device 50 is requesting to transmit a smaller number of data units than the number of data units stored in the data buffer 12, the number of prefetch words updating section 41 re-sets a value of the number of prefetch words set in the number of words setting table 42 and associated with the address contained in the request to a value smaller than the current value (step S1102). Note that the values to be re-set can be determined freely.

As described above, in the data processing system according to the fourth embodiment of the present invention, each time data transmission to the master device takes place, the slave device re-sets a plurality of values of the number of prefetch words associated with addresses. By doing so, the optimal value of the number of prefetch words for the system can be automatically set without the user being aware of it. Thus, the number of unnecessary data transfer processes performed by the slave device in response to a read transfer request for data issued by the master device is reduced, and accordingly, the data processing efficiency of the entire system is improved. In addition, even in the case where different values of the number of prefetch words are used for different data types, or the case where a plurality of master devices are connected to the same system bus and both a single transfer and a burst transfer are performed, flexible operation can be achieved.

Note that the functional block of each of a bus interface, a data buffer, a prefetch control section, a number of prefetch words setting section, an address retrieval section, a number of words setting table, and a number of prefetch words updating section which compose a data transmission processing apparatus of the present invention is typically realized in the form of an LSI, an integrated circuit, which may be called an IC, a system LSI, a super LSI, an ultra LSI, or the like, depending on the degree of integration. The functional blocks may be individually integrated in one chip, or part or all of the functional blocks may be integrated in one chip.

The method of realizing an integrated circuit is not limited to an LSI; the integrated circuit may be realized using a dedicated circuit or general processor. Alternatively, it is also possible to use an FPGA (Field Programmable Gate Array) which can be programmed after the fabrication of the LSI, or a reconfigurable processor which enables the reconfiguration of the connections or settings of circuit cells in the LSI.

Further, with the advancement of semiconductor technologies or other technologies derived therefrom, if integrated circuit technologies which replace LSIs emerge, as a matter of course, the functional blocks may be integrated using such technologies. The applications of biotechnologies, etc., are possible cases.

While the invention has been described in detail, the foregoing description is in all aspects illustrative and not restrictive. It is understood that numerous other modifications and variations can be devised without departing from the scope of the invention.

What is claimed is:

1. A data processing system for performing data request and transmission between devices connected to each other via a system bus, comprising:
   at least one master device which issues a data transmission request; and
   at least one slave device which performs data transmission in response to the request from the master device, wherein the slave device includes:

a data buffer for temporarily storing data read in advance for transmission to the master device;

a number of prefetch words setting section for setting a value of a number of data words sequentially receivable by the master device at a time; and a prefetch control section for reading, in response to the request from the master device, contiguous data units having a quantity equal to the value of the number of data words set in the number of prefetch words setting section, from a predetermined memory and then storing the contiguous data units in the data buffer, wherein the number of prefetch words setting section includes:

a number of words setting table in which a plurality of values of the number of data words are set so as to be associated with addresses in the memory; and an address retrieval section for retrieving from the number of words setting table a value of the number of data words associated with an address contained in the request from the master device and then outputting the value to the prefetch control section, and wherein the number of words setting table has the values of the number of data words set for different data types or the number of words setting table has the values of the number of data words set for a plurality of master devices.

2. The data processing system according to claim 1, wherein the slave device further includes a number of prefetch words updating section for updating the value of the number of data words set in the number of prefetch words setting section, based on a number of data words actually transmitted to the master device.

3. The data processing system according to claim 1, wherein the slave device further includes a number of prefetch words updating section for updating a value of the number of data words set in the number of words setting table, based on a number of data words actually transmitted to the master device and a storage address for the transmitted data words.

4. The data processing system according to claim 1, wherein the number of data words sequentially receivable by the master device at a time is preset by the master device in the number of prefetch words setting section.

* * * * *